United States Patent
Ross et al.

(10) Patent No.: US 6,931,515 B2
(45) Date of Patent: Aug. 16, 2005

(54) METHOD AND SYSTEM FOR USING DYNAMIC, DEFERRED OPERATION INFORMATION TO CONTROL EAGER DEFERRAL OF CONTROL-SPECULATIVE LOADS

(75) Inventors: Jonathan K. Ross, Woodinville, WA (US); Dale Morris, Steamboat Springs, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 450 days.

(21) Appl. No.: 10/208,095

(22) Filed: Jul. 29, 2002

(65) Prior Publication Data

US 2004/0019768 A1 Jan. 29, 2004

(51) Int. Cl.$^7$ ............................................. G06F 9/312
(52) U.S. Cl. ................................. 712/216; 712/225
(58) Field of Search ................................. 712/216, 225

(56) References Cited

U.S. PATENT DOCUMENTS

| | | | |
|---|---|---|---|
| 5,881,280 A | 3/1999 | Gupta et al. | |
| 2001/0004757 A1 * | 6/2001 | Miyake et al. | 712/218 |
| 2002/0066005 A1 * | 5/2002 | Shibayama et al. | 712/218 |
| 2002/0178349 A1 * | 11/2002 | Shibayama et al. | 712/235 |

FOREIGN PATENT DOCUMENTS

GB         2294341         4/1996

* cited by examiner

Primary Examiner—William M. Treat (57) ABSTRACT

A method and system for determining, at run-time, whether or not to defer an exception that arises during execution of a control-speculative load instruction based on a recent history of execution of that control-speculative load instruction. The method and system relies on recent execution history stored in a speculative-load-accelerated-deferral table. If an exception arises during execution of a control-speculative load instruction, then the speculative-load-accelerated-deferral table is searched for an entry corresponding to the control-speculative load instruction. If an entry is found, then the exception is deferred, since the speculative-load-accelerated-deferral table indicates that a recent exception arising from execution of the control-speculative load instruction was not recovered via a chk.s-mediated branch to a recovery block, and not otherwise used by a non-speculative instruction. By contrast, if no entry corresponding to the control-speculative load instruction is found in the speculative-load-accelerated-deferral table, then the exception is immediately handled.

21 Claims, 7 Drawing Sheets

| r0 | IP |
|---|---|
| r1 | 0 |
| r2 | 0 |
| r3 | IP |
| r4 | 0 |
| r5 | 0 |
| r6 | 0 |
| r7 | 0 |
| r8 | 0 |
| r9 | 0 |
| r10 | 0 |
| r11 | 0 |
| r12 | IP |

METHOD AND SYSTEM FOR USING DYNAMIC, DEFERRED OPERATION INFORMATION TO CONTROL EAGER DEFERRAL OF CONTROL-SPECULATIVE LOADS

TECHNICAL FIELD

The present invention relates to static control speculation of load instructions supported by modern computer processor architectures and, in particular, to a method and system for using dynamic exception-handling information during execution of a routine in order to trigger eager deferrals of certain exception conditions and other long-latency operations that arise or become necessary during execution of control-speculative load instructions.

BACKGROUND OF THE INVENTION

The present invention is related to static control speculation of load instructions supported by modem processor architectures, such as the Intel® IA-64 processor architecture. Control speculation of load instructions allows a load instruction to be relocated, for optimization purposes, above a flow control point, conditional branch instruction, or predicate computation that, in corresponding, original, non-optimized code, controls whether or not the load instruction is executed. A check instruction is placed in the same position, relative to the conditional branch instruction, that is occupied by the load instruction in the non-optimized code. The processor defers certain exceptions that arise during execution of the relocated, control-speculative load instruction until a check instruction or other non-speculative instruction consumes the results of the load instruction. Currently, exception deferral strategies for control speculation of load instructions are statically determined, by compilers and operating systems, without the benefit of run-time information that might more accurately suggest whether or not certain types of exceptions arising during execution of load instructions should or should not be deferred. Designers and manufacturers of modem processors, as well as compiler developers and users of computer systems based on modern processors, have recognized the need for a method and system that allows for run-time determination of which exceptions and other long-latency operations that arise during execution of speculative loads should be deferred.

SUMMARY OF THE INVENTION

One embodiment of the present invention provides a method and system for determining at run-time, by a modem processor, whether or not to defer an exception that arises, or another long-latency operation that becomes necessary, during execution of a control-speculative load instruction based on a recent history of execution of that control-speculative load instruction. The method and system relies on recent history stored in a speculative-load-accelerated-deferral table. If a long latency operation (e.g. TLB miss or cache miss to main memory) becomes necessary during execution of a control-speculative load instruction, then the speculative-load-accelerated-deferral table is searched for an entry corresponding to the control-speculative load instruction. If an entry is found, then the long latency operation is deferred, since the speculative-load-accelerated-deferral table indicates that the results of a recent execution of the control-speculative load instruction were not used by the program. By contrast, if no entry corresponding to the control-speculative load instruction is found in the speculative-load-accelerated-deferral table, then the long latency operation is immediately launched, including possible exception processing. When a non-speculative instruction (including chk.s) consumes the result of a speculative load the speculative-load-accelerated-deferral table is searched and the corresponding entry is removed from the speculative-load-accelerated-deferral table in order to indicate that the result of the control-speculative load instruction was recently used by the program. In another embodiment of the current invention, entries are added to the speculative-load-accelerated-deferral-table only when a speculative load exception is deferred and entries are removed from the table when a speculative load succeeds or a non-speculative instruction consumes a deferred exception token.

DETAILED DESCRIPTION OF THE INVENTION

One embodiment of the present invention provides a means for a modern processor to determine, at run time, whether or not to defer an exception or other long-latency operation that arises, or becomes necessary, during execution of a control-speculative load instruction. Currently, deferral decisions are made by a compiler statically, without the benefit of run-time information that might indicate the desirability of deferral, at some points in time, or of immediate exception handling or other long-latency operation execution, at other points in time. A means for determining whether or not to defer an exception, or other long-latency operation, based on run-time state is needed in order to avoid speculation overhead and better optimize deferral policies.

Control speculation of load instructions, and the above-mentioned deficiencies in current architecture support for control speculation, are best illustrated using a simple programming example. A very short, C++-like pseudocode implementation of two classes is presented below, along with a short pseudo-assembly-language version of a for-loop extracted from a function member of one of the two classes. The C++-like pseudocode provides a context for a detailed discussion of certain aspects of the pseudo-assembly-language version of a portion of the member function.

The C++-like pseudocode implements a class "candidate" and a class "election." An instance of the class "candidate" represents a candidate running in an election, and an instance of the class "election" represents an election in which votes for candidates are polled and a winner determined. This simple C++-like pseudocode is provided only as an illustrative context for discussion of a pseudo-assembly-language version of a portion of the function member "winner" of the class "election," and error checking and functionality that would be included in a program intended for actual use are therefore omitted. First, the C++-like pseudocode begins with an include directive and three constant declarations:

1 #include <string.h>
2 const int MAX_NAME=100;
3 const int MAX_BIO=4096;
4 const int MAX_CANDIDATES=100

The include statement, on line 1, includes a header file that specifies various string functions. The constants "MAX_NAME," "MAX_BIO," and "MAX_CANDIDATES" are used to bound the sizes of data-array members that contain the name and biography of a candidate and a number of candidates in an election, respectively.

```
 1 class candidate
 2 {
 3   private:
 4     char name[MAX_NAME];
 5     int candidateNo;
 6     char bio[MAX_BIO];
 7     int numVotes;
 8   public:
 9     bool in(const char* c) {return strstr(name, c) != NULL;};
10    char* getName( ) {return name;};
11    void setName(const char* nm) {strcpy(name, nm);};
12    int getNo( ) {return candidateNo;};
13    void setNo(int n) {candidateNo = n;};
14    char* getBio( ) {return bio;};
15    void setBio(const char* b) {strcpy(bio, b);};
16    int getVotes( ) {return numVotes;};
17    void incVotes( ) {numVotes++;};
18    candidate( );
19    ~candidate( );
20 };
```

An instance of the class "candidate" includes the following data members, declared above on lines 4–7: (1) "name," a character array that contains the name of the candidate; (2) "candidateNo," a number assigned as an identifier for the candidate; (3) "bio," a large character array that contains a biography for the candidate; and (4) "numVotes," the number of votes collected for the candidate. The class "candidate" includes the following member functions, declared above on lines 9–19: (1) "in," a member function that determines whether the character string supplied as argument "c" is contained within the name of the candidate stored in data member "name;" (2) "getName" and "setName," function members that store the name of a candidate into, and retrieve the name of a candidate from, the data-array member "name;" (3) "getNo" and "setNo," function members that store the assigned number of a candidate into, and retrieve the assigned number of a candidate from, the data member "candidateNo;" (4) "getBio" and "setBio," function members that store the biography for a candidate into, and retrieve the biography for a candidate from, the data-array member "bio;" (5) "getVotes" and "incVotes," function members that retrieve the number of votes from data member "numVotes" and increment, by one, the value contained in the data member "numVotes;" and (6) a constructor and deconstructor for the class "candidate."

Next, a declaration for the class "election" is provided:

```
 1 class election
 2 {
 3   private:
 4     candidate candidates[MAX_CANDIDATES];
 5     int num;
 6   public:
 7     void addCandidate(const char* c, int n, const char* bio);
 8     candidate* getCandidate(int cNo) {return
 9       (cNo <= num && cNo >= 0) ? &(candidates[cNo - 1]):
          NULL;};
10    void vote (const char* c);
11    int winner( );
12    election( );
13    ~election( );
14 };
```

An instance of the class "election" includes the following two data members, declared above on lines 4–5: (1) "candidates," a data-array member that contains a number of instances of the class "candidate;" and (2) "num," and integer containing the number of instances of the class "candidates" in the data-array member "candidates." The class "election" includes the following function members, declared above on lines 7–13: (1) "addCandidate," a function member that adds a candidate to the election; (2) "getCandidate," a function member that returns a pointer to an instance of the class "candidate" having an assigned identifying number equal to the value of the supplied argument "cNo;" (3) "vote," a function member for casting a vote for those candidates whose names contain the string supplied as argument "c;" (4) "winner," a function member that selects the winner of the election; and (5) a constructor and deconstructor for the class "election."

Most of the implementations of the function members for the class "candidate" are in-line functions specified in the class declaration. The single exception is the constructor for the class "candidate," provided below:

```
1 candidate::candidate( )
2 {
3   strcpy(name, "");
4   numVotes = 0;
5 }
```

An implementation for the function member "addCandidate" of the class "election" is provided below:

```
1 void election::addCandidate(const char* c, int n, const char* b)
2 {
3   candidates[num].setName(c);
4   candidates[num].setBio(b);
5   candidates[num].setNo(n);
6   num++;
7 }
```

The function member "addCandidate" simply sets the name and biography supplied as arguments "c" and "b" into an instance of the class "candidates" stored in the data array "candidates" and increments the data member "num" to reflect addition of a new candidate.

An implementation for the function member "vote" of class "election" is provided below:

```
1 void election::vote(const char* c)
2 {
3    int i;
4    for (i = 0; i < num; i++)
5    {
6       if (candidates[i].in(c) candidates[i].incVotes( );
7    }
8 }
```

The function member "vote" iterates through all the instances of the class "candidate" in the data-array member "candidates" in the for-loop of lines 4–7, incrementing the data member "numVotes" for those candidates whose name includes the substring provided as argument "c."

An implementation for the function member "winner" of the class "election" is provided below:

```
1 int election::winner( )
2 {
3    int i, maxVotes = 0;
4    int res = -1;
5    for (i = 0; i < num; i++)
6    {
7       if (candidates[i].getVotes( ) > maxVotes)
8       {
9          res = candidates[i].getNo( );
10         maxVotes = candidates[i].getVotes( );
11      }
12   }
13   return res;
14 }
```

The function member "winner" iterates through all instances of the class "candidate" and data-array member "candidates" in the for-loop of lines 5–12 searching for the instance of class "candidate" that contains the largest number of votes. If the currently considered instance of the class "candidate" has a greater number of votes than the value stored in the local variable "maxVotes," as determined by function member "winner" on line 7, then the currently considered candidate, "candidates[i]," is the candidate with the highest number of votes so far considered in the for-loop of lines 5–12, and the statements on lines 9–10 are executed. The local variable "res" is set to the number assigned to the currently considered candidate, and the local variable "max-Votes" is set to the number of votes that the currently considered candidate "candidates[i]" received in the election. Following completion of the for-loop of lines 5–12, the name of the winner of the election is returned, on line 13.

Finally, the constructor for the class "election" is provided:

```
1 election::election( )
2 {
3    num = 0;
4 }
```

The following discussion focuses on an exemplary for-loop from the function member "winner" of the class "election," discussed above:

```
5    for (i = 0; i < num; i++)
6    {
7       if (candidates[i].getVotes( ) > maxVotes)
8       {
9          res = candidates[i].getNo( );
10         maxVotes = candidates[i].getVotes( );
11      }
12   }
```

A possible pseudo-assembly-language version of this for-loop is provided below:

```
// r1 = this
// r2 = offset to num
// r3 = offset to candidates
// r4 = sizeof(candidate)
// r5 = offset to candidateNo
// r6 = offset to numVotes
// r7 = maxVotes
// r8 = i
// r9 = res
 1              mov r8 = 0              // i = 0
 2              add r10 = r1, r2
 3              ld8 r11 = [r10]         // r11 = num
 4              add r12 = r1, r3        // r12 = &(candidates[0])
 5 LOOP:        cmp.lt p0, p1 = r8, r11 // i < num
 6              (p1) br.cond ENDLOOP    // if (i >= num) terminate loop
 7              add r13 = r12, r6
 8              ld8 r14 = [r13]         // r14 = candidates[i].num-
                                        //       Votes
 9              cmp.gt p2, p3 = r14, r7 // candidates[i].numVotes >
                                        //       maxVotes
10              (p3) br.cond CONTIN     // if (candidates[i].num-
                                        //       Votes <=
11              add r15 = r12, r5       //       maxVotes) continue
12              ld8 r9 = [r15]          // res = candidates[i].candi-
                                        //       dateNo
13              mov r7 = r14            // maxVotes = candidates[i].
                                        //       numVotes
14 CONTIN:      add r8 = 1, r8          // i = i + 1
15              add r12 = r12, r4       // r12 = &(candidates[I])
16              br LOOP
17 ENDLOOP:
```

In the commented lines at the beginning of the above pseudo-assembly-language code, definitions for registers "r1"–"r9" are provided in terms of data members and local variables of the corresponding C++-like pseudocode, described above. Thus, the contents of register "r1" contains the memory address of the start of the relevant instance of the class "election," and the contents of the registers "r2" and "r3" are offsets to the data members "num" and "candidates" within the instance of the class "election." The contents of the register "r4" contain the size, in bytes, of an instance of the class "candidate." The contents of registers "r5" and "r6" contain offsets to the data members "candidateNo" and "numVotes," respectively, within an instance of the class "candidate." The registers "r7," "r8," and "r9," represent the local variables "maxVotes," "i," and "res," respectively.

On line 1, the contents of register "r8" are set to 0, implementing the C++-like pseudocode initialization of the for-loop variable "i" on line 5 of the exemplary for-loop, above. Next, on lines 2–3, the memory address for the data member "num" of the instance of class "election" that starts at the memory address contained in register "r1" is computed and stored in register "r10," and the value of the data member "num" is then fetched from memory and stored in register "r11" via a load instruction on line 3. The address of the first element of the array "candidates" is computed and stored in register "r12" on line 4. The compare instruction, on line 5, compares the value stored in register "r8" with that stored in register "r11," implementing the test portion of the exemplary for-loop on line 5, above. The compare statement sets the predicate registers "p0," and "p1" to the Boolean value of the test expression and the complement of the Boolean value of the test expression, respectively. If i is greater than or equal to num, as determined by the contents of predicate register "p1," then the branch on line 6 of the assembly code is taken to end execution of the loop that begins on line 4 of the above assembly code. Otherwise, on lines 7–8, the memory address for the data member "numVotes" of the currently considered instance of the class "candidate," "candidates[i]," is computed and the value stored in the data member "numVotes" of the currently considered instance of the class "candidate" is fetched from memory and stored in register "r14." The compare instruction on line 9 compares the number of votes for the currently considered instance of the class "candidates" with local variable "maxVotes," setting the predicate registers "p2" and "p3." If, as stored in predicate register "p3," the number of votes for the currently considered candidate is not greater than the contents of local variable "maxVotes," then the conditional branch on line 10 is taken to continue execution of the loop following incrementing of the variable "i" on line 14 and setting register "r12" to point to the next candidate. Otherwise, local variable "res" is set to point to the number assigned to the currently considered candidate, on lines 11 and 12, where register "r9" corresponds to the local variable "res," and local variable "maxVotes" is set to the number of votes for the currently considered candidate on line 13.

Consider the load instruction on line 12 of the above pseudo-assembly-language extract. A load instruction generally requires a larger number of processor cycles, and a greater degree of execution latency involved in cache accesses through a processor bus, than register-to-register instructions, such as the move instruction on line 16. Optimizing compilers seek to move load instructions upward, in the execution sequence, so that they can execute in parallel with register-to-register instructions, and complete prior to the need for the value accessed by the load instruction. For example, lines 11 and 12 could be moved, by an optimizing compiler, upward, directly after line 8, as follows:

```
1         mov r8 = 0              // i = 0
2         add r10 = r1, r2
3         ld8 r11 = [r10]         // r11 = num
4         add r12 = r1, r3        // r12 = &(candidates[0])
5 LOOP:   cmp.lt p0, p1 = r8, r11 // i < num
6         (p1) br.cond ENDLOOP    // if (i >= num) terminate loop
7         add r13 = r12, r6
8         ld8 r14 = [r13]         // r14 = candidates[i].numVotes
9         add r15 = r12, r5       //        maxVotes) continue
10        ld8 r9 = [r15]          // res = candidates[i].candidate-
                                         No
11        cmp.gt p2, p3 = r14, r7 // candidates[i].numVotes >
                                         maxVotes
12        (p3) br.cond CONTIN     // if (candidates[i].numVotes <=
13        mov r7 = r14            // maxVotes = candidates[i].
                                         numVotes
14 CONTIN: add r8 = 1, r8         // i = i + 1
15        add r12 = r12, r4       // r12 = &(candidates[I])
16        br LOOP
17 ENDLOOP:
```

The load is launched, in the second version of the assembly code, above, prior to the need for the results of the load instruction, stored in register "r9." Because modern processors, such as processors conforming to the Intel® IA-64 processor architecture, referred to below as "the IA-64 processor," pipeline instructions and because these modern processors employ non-blocking caches, the load instruction executes in parallel with subsequent instructions. In the current case, the results of the load instruction are needed only following termination of the loop and return from the function member "winner."

However, should an exception arise during execution the load instruction, the run-time system needs to defer the exception until the results of the load instruction are actually used. Otherwise, had the load instruction not been executed in the non-optimized code because of the controlling conditional branch, an exception arises during execution of the relocated load instruction would not have arisen had the assembly code not been optimized by moving the load instruction upward. The optimized program may fail, with a fault condition, in a case in which the non-optimized program would have executed correctly to completion. For example, consider the conditional branch instruction in the first version of the assembly code, on line 10, directly above computation of the memory address of the data member "candidateNo" on line 11 and the load instruction that fetches the contents of the computed memory address, on line 12. In many cases, when the currently considered candidate does not have a number of votes greater than the value in maxVotes, the instructions immediately following the conditional branch on line 10 are not executed. Consider, by contrast, the second assembly code version, in which the load instruction originally on line 12 has been relocated above the conditional branch originally on line 10. In the optimized assembly code, the load instruction is executed during each iteration of the loop, rather than only when a currently considered candidate has a greater number of votes than the value stored in maxVal. If an exception occurs during execution of the load instruction in a loop iteration in which, in the non-optimized code, the load instruction would not have been executed, then the optimized assembly code may fail in a case in which the non-optimized assembly code would not have failed.

The above-described problem is solved, in modern processors, such as the Intel IA-64 processor family, by providing for control speculation of load instructions. The following pseudo-assembly-language code includes a control-speculative version of the load instruction, originally on line 12, but relocated upward to line 10:

```
1          mov r8 = 0               // i = 0
2          add r10 = r1, r2
3          ld8 r11 = [r10]          // r11 = num
4          add r12 = r1, r3         // r12 = &(candidates[0])
5 LOOP:    cmp.lt p0, p1 = r8, r11  // i < num
6          (p1) br.cond ENDLOOP     // if (i >= num) terminate loop
7          add r13 = r12, r6
8          ld8 r14 = [r13]          // r14 = candidates[i].num-
                                          Votes
9          add r15 = r12, r5        //        maxVotes) continue
10         ld8.s r9 = [r15]         // res = candidates[i].candi-
                                          dateNo
11         cmp.gt p2, p3 = r14', r7 // candidates[i].numVotes >
                                          maxVotes
12         (p3) br.cond CONTIN      // if (candidates[i].num-
                                          Votes <=
13         mov r7 = r14             // maxVotes = candidates[i].
                                          numVotes
14         chk.s r9, RECVR
15 CONTIN: add r8 = 1, r8           // i = i + 1
16         add r12 = r12, r4        // r12 = &(candidates[I])
17         br LOOP
18 RECVR:  ld8 r9 = [r15]
19         br CONTIN
20 ENDLOOP:
```

Note that the two instructions that originally resided on lines 11 and 12 are relocated upward to lines 9 and 10. Thus, the add instruction that computes the address of the data member "candidateNo," and the subsequent load instruction that loads the value of candidateNo from memory into register "r9," have now been moved above the conditional branch instruction, originally on line 10 and now on line 12, that, in the non-optimized pseudo-assembly-language extract, control whether or not the two instructions are executed. By moving the two instructions upward, the long-latency load instruction can be executed in parallel with the subsequent compare and branch instructions so that, when the result is needed, the value will have already been successfully fetched from memory. A new instruction, "chk.s," now occupies line 14 in the same place originally occupied by the two relocated instruction with respect to the conditional branch instruction now on line 12, and the load instruction that was moved upward has now become a "ld8.s" instruction. The ".s" suffix indicates a control-speculated load, for which the processor defers certain exceptions that occur during execution of the load instruction until the register containing the result of the load instruction is subsequently used in a non-speculative instruction or specified as an argument to a chk.s instruction. The chk.s instruction on line 14 checks to see if the previously executed load instruction, on line 10, successfully completed, without exceptions. If no exceptions occurred, then the processor continues by executing the next instruction following the chk.s instruction. However, if an exception did occur during previous execution of the load instruction on line 10, then a branch is taken to the instruction labeled with the label "RECVR," on line 18. The label "RECVR" labels a recovery block, in which the load instruction is reissued prior to branching back to the statement labeled with the label "CONTIN," the increment instruction on line 15. Thus, if the load instruction on line 10 executes without exceptions, then the only difference between execution of the optimized and the non-optimized code is that the load instruction is launched earlier in the loop in order to execute in parallel with subsequent instructions, and ultimately decrease instruction-execution latency. However, if execution of the load instruction raises an exception, then the exception is deferred until the point in the instruction-stream when the non-optimized load instruction would have been executed, as determined by the position of the chk.s instruction. At this point, a branch is taken to a recovery block where the load is reexecuted. If execution of the load succeeds within the recover block, then the code executes as if the initial load execution had not raised an exception, but if the load again fails, an exception is immediately raised and appropriately handled.

Figure 1:
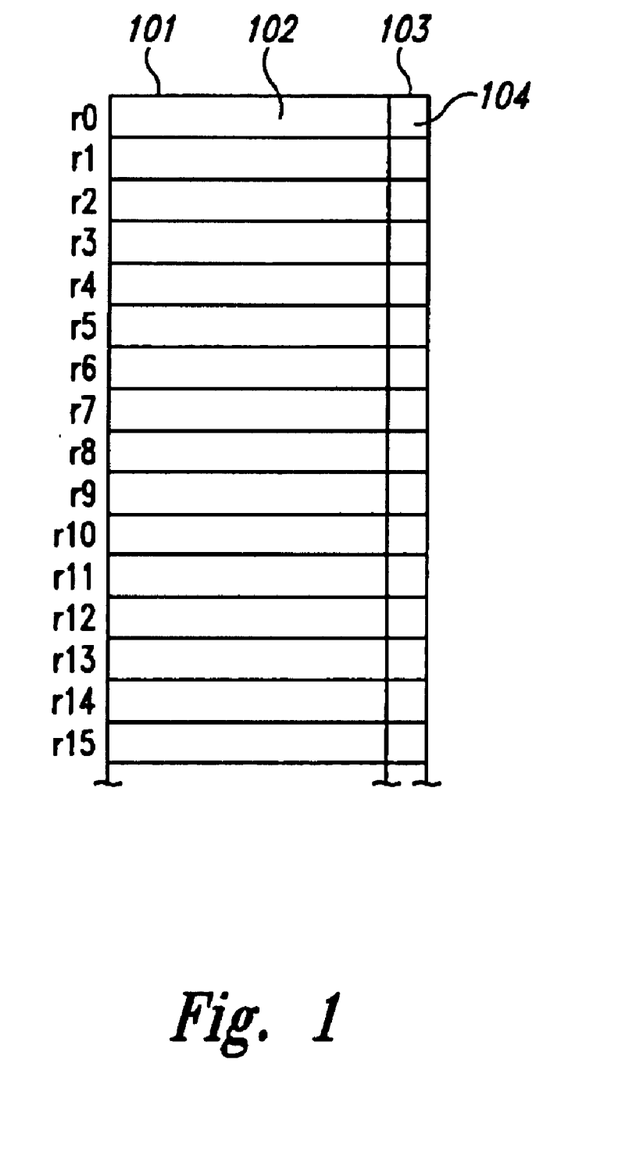
FIG. 1 illustrates a portion of the general 64-bit integer registers of the IA-64 processor.

Control speculation is made possible in the IA-64 processor by the addition of various registers and register fields within the register set as well as by control-speculation logic included in the processor. FIG. 1 illustrates a portion of the general 64-bit integer registers of the IA-64 processor. In FIG. 1, the 64-bit general-purpose integer registers "r0," "r1," . . . are shown in a column of registers 101 labeled with the register names. Each general-purpose, 64-bit integer register, such as register "r0" 102, is associated with a special, 1-bit attribute. These special, 1-bit attributes are shown in a column of 1-bit registers 103 in FIG. 1 aligned with the general-purpose registers 101. Thus, for example, the first special 1-bit attribute 104 is associated with general-purpose register "r0" 102. The special 1-bit registers are referred to as "NAT" bits, standing for "not-a-thing" bits. The NAT bits may be implemented as a set of 1-bit registers, or may be implemented using reserved values or extra bits within general registers. The NAT bit associated with a general-purpose register has the value "1" after an exception has been deferred during loading of the register via a speculative load instruction, and otherwise has the value "0." Nat bits also may propagate to another register, when the contents of, or value derived from the contents of, a register with a NAT bit having the value "1" is stored in the register.

Figure 2:
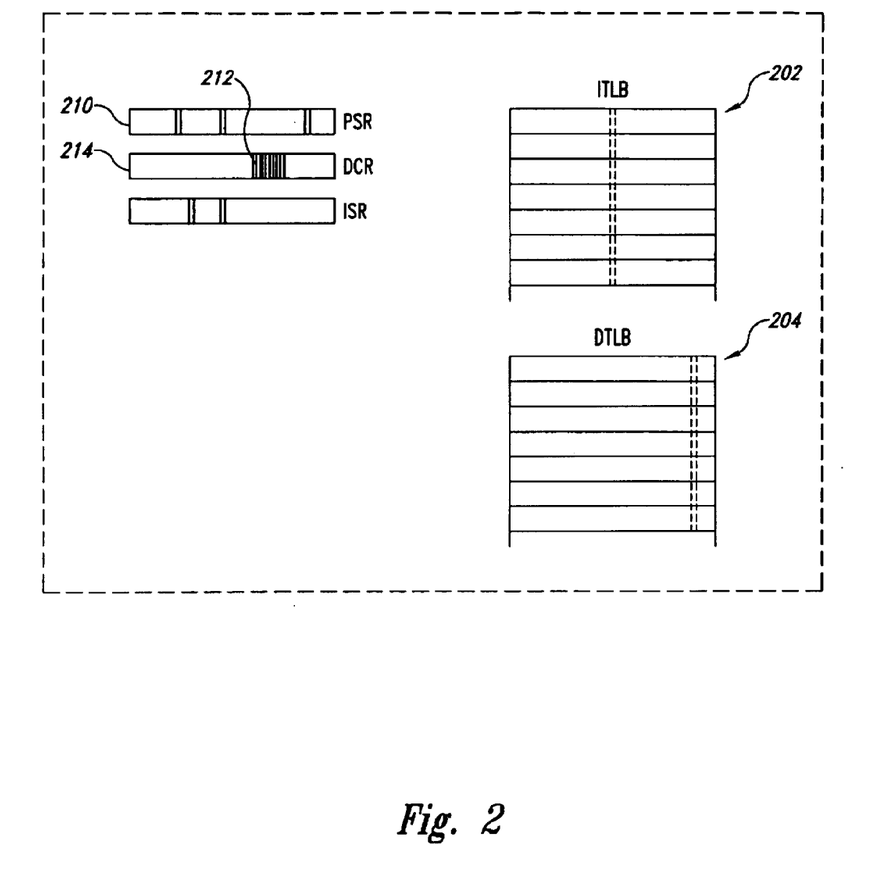
FIG. 2 illustrates the system registers involved in configuring control speculation within the IA-64 processor.

Control speculation is configurable via fields within various system registers. FIG. 2 illustrates the system registers involved in configuring control speculation within the IA-64 processor. The IA-64 processor employs two translation caches that store virtual-memory-to-physical-memory translations for virtual-memory addresses. The first translation cache 202 is the instruction translation look aside buffer ("ITLB") which stores virtual-memory-to-physical-memory translations for the virtual-memory addresses of instructions. A data translation look aside buffer ("DTLB") 204 stores virtual-memory-to-physical-memory translations for virtual-memory addresses of data within memory. In an ITLB entry, such as ITLB entry 203, a bit field 205, referred to as "ITLB.ed," indicates whether or not there is recovery code for speculated instructions. If the field "ITLB.ed" has a value "1," then recovery code for deferred exceptions that arise during execution of speculative load instructions have been inserted in the code. Similarly, a DTLB entry, such as DTLB entry 206, which represents the translation of a virtual-memory data address, includes a field "DTLB.ma" 207 that indicates the speculative, cacheability, and write-policy characteristics of the corresponding virtually mapped page. The field "DTLB.ma" may be used by the processor to determine whether or not exceptions should or should not be deferred. For example, the virtual memory may map to an I/O device, for which access may involve side effects, and for which failed operations should not be retried. The processor status register ("PSR") 210 includes three bit fields that control whether or not the processor defers certain exceptions that arise during execution of a control-speculative load instruction. When the bit field "PSR.ic" has the value 0, all exceptions arising during control-speculative load execution are deferred, a mode of processing useful for operating-system routines in which immediate handling of exceptions is inconvenient. The bit field "PSR.it" indicates whether or not 64-bit instruction addresses are virtual or physical. When this bit field has the value "0," the processor will not eagerly defer exceptions from speculative load instructions. Finally, when the bit field "PSR.ed" has the value "0," exception deferral is forced on restarted control-speculative loads. The operating system can control, to a certain extent, the types of exceptions that can be deferred during control speculation. When the values of PSR.ic, PSR.it, and ITLB.ed are all equal to 1 during execution of a load instruction, then whether or not an exception of a particular exception type that arises is deferred is determined by whether or not a bit within a range of bits 212 within the DCR register 214 corresponding to the particular exception type is set. Thus, an operating system may designate certain types of exceptions for deferral, while other types of exceptions are not deferred, but are instead immediately handled.

The details of the exact behavior of the IA-64 processor in response to the values in the various bit fields described above are beyond the scope of the discussion necessary to provide background for the present invention. Those details are available in the Intel IA-64 Architecture Software Developers Manuals, Volumes 1–4, published by Intel. However, it is important to note that the NAT bits associated with general-purpose registers, as well as similar encodings associated with floating-point registers, flag the occurrence of exceptions during speculated load execution, that processor behavior with respect to execution of speculated load instructions is configurable, via certain system registers, and that certain exceptions that may arise during execution of the speculated load instruction may be configured, via the DCR register, to be deferred or to be immediately raised. It should also be noted that NAT bits propagate to registers to which the contents of a register associated with a set NAT bit are moved, or to which results derived from a value stored in register associated with a set NAT bit are stored. Propagation of NAT bits insures that invalid register contents resulting from deferred speculative loads are not used as a result of transferring the invalid register contents to another register.

Figure 3:
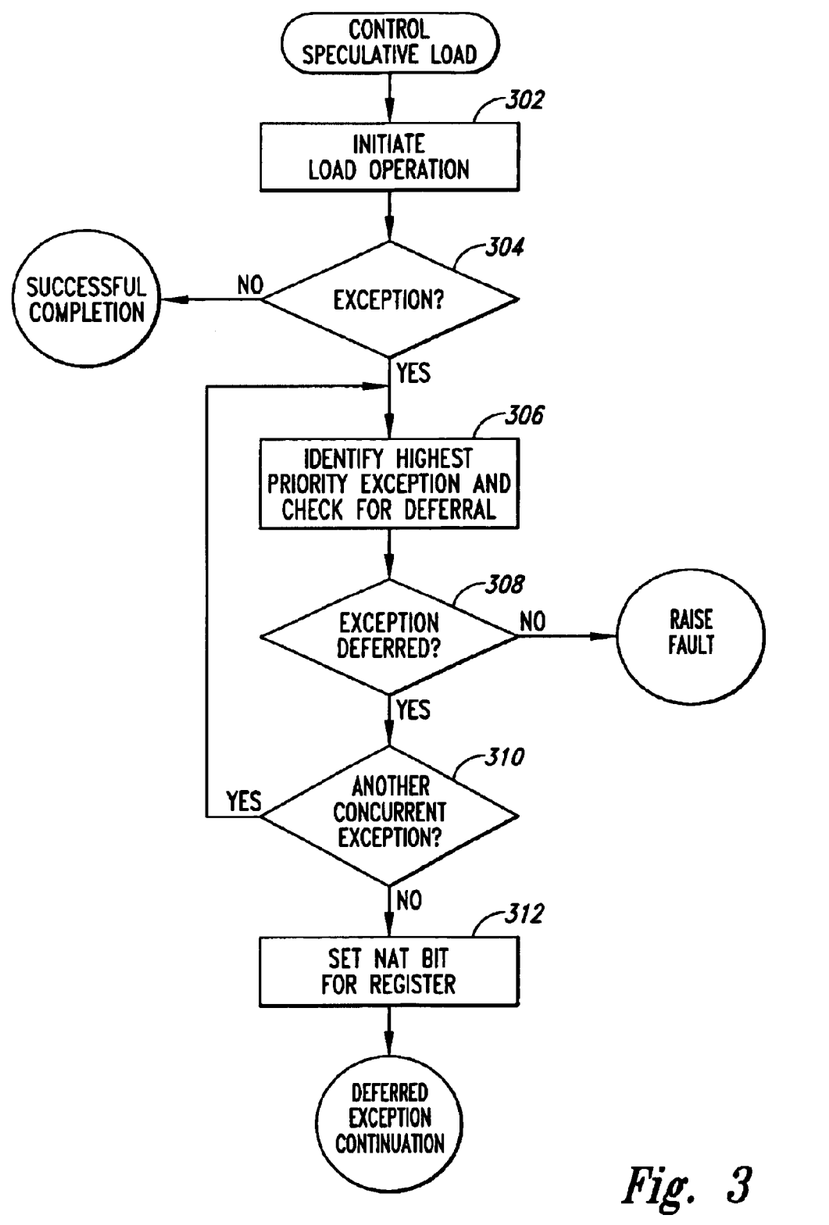
FIG. 3 is a flow-control diagram that represents processing of a control-speculated load instruction.

FIG. 3 is a flow-control diagram that represents processing of a control-speculated integer load instruction. In step 302, the processor initiates the load operation. In step 304, the processor determines whether or not an exception condition has occurred during processing of the load operation. If an exception condition has not occurred, then control speculative load processing finishes with a successful completion. Otherwise, in step 306, the processor identifies the highest priority exception among the one or more exceptions that may have occurred and checks the status registers to determine whether or not that exception should be deferred. If, as determined in step 308, the exception is not deferrable under the current configuration stored within system registers, then a fault is immediately raised. Otherwise, in step 310, the processor determines whether additional exceptions have yet to be considered. If so, then control flows back to step 306. Otherwise, the NAT bit associated with the target register of the load instruction is set to the value "1," in step 312, and execution of the load instruction terminates with a deferred exception condition.

Figure 4:
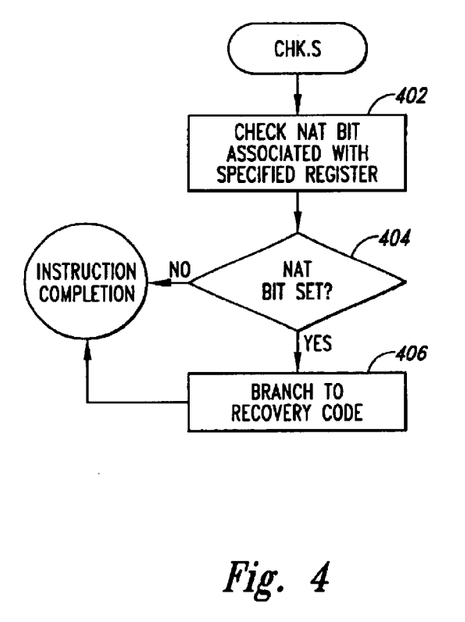
FIG. 4 is a flow control diagram for execution of a chk.s instruction following a speculated load instruction.

FIG. 4 is a flow control diagram for execution of a chk.s instruction following a control-speculative integer load instruction. In step 402, the processor checks the NAT bit associated with the register specified in the chk.s instruction to determine whether or not the NAT bit is set, indicating occurrence of an exception during prior execution of a load instruction directed to the specified register. If the NAT bit is set, as detected in step 404, then the processor branches to the recovery code specified in the chk.s instruction in step 406. Otherwise, execution of the chk.s instruction is complete.

In general, a compiler attempts to infer when and when not to relocate load instructions with respect to conditional branch instructions, and other conditional statements, using the control-speculation instructions "ld.s" and "chk.s." In certain cases, using static analysis or profile information, the compiler can determine, with a fair degree of certainty, that the load-instruction relocation will save processor cycles and produce more efficient, optimized code. In other cases, the task may be impossible, since the run-time behavior of the code depends on run-time values that cannot be known, in advance, by the compiler. The C++-like pseudocode routines, discussed above, provide an example of this second, problematic case.

Figure 5:
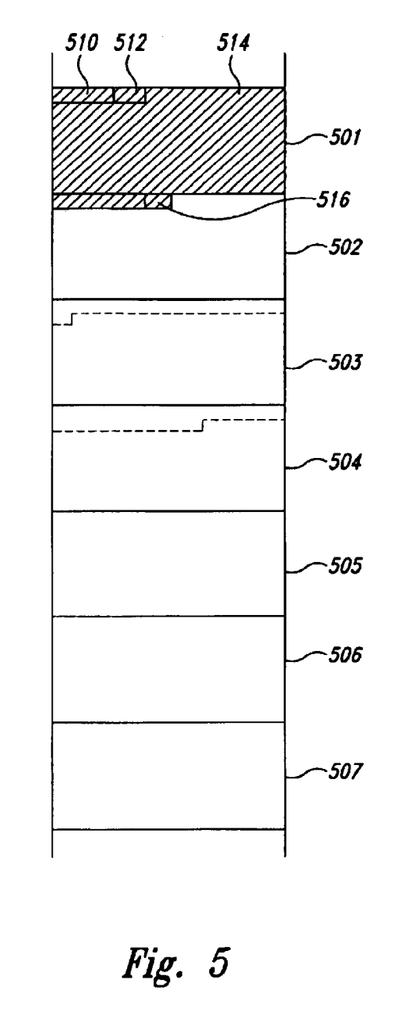
FIG. 5 illustrates layout of the data components of instances of the class "candidate" in memory.

Consider the layout of the stored data for each instance of the class "candidate" in the data-array member "candidates" of an instance of the class "election." FIG. 5 illustrates layout of the data components of instances of the class "candidate" in memory. In FIG. 5, a portion of the virtual-memory for a computer system is illustrated as a sequence of virtual-memory pages 501–507. For the sake of this example, assume that the size of a virtual-memory page is 4096 bytes. Next, consider an instance of the class "candidate." An instance of the class "candidate" includes four data members. The memory region occupied by an instance of the class "candidate" is shown, in FIG. 5, superimposed over the virtual-page structure of the portion of virtual memory. A first portion of the memory occupied by an instance of the class "candidate" stores the data member "name" 510. A second portion of the memory occupied by an instance of the class "candidate" stores the 64-bit-integer data member "candidateNo" 512. A third portion of the memory occupied by an instance of the class "candidate" stores the large character array data member "bio" 514. Finally, a 64-bit integer contains the data member "numVotes" 516. As can be seen in FIG. 5, because of the size of the data-array member "bio," the virtual memory occupied by data member "candidateNo" 512 resides on a different virtual-memory page than the portion of virtual memory occupied by the data member "numVotes" 516.

Consider, again, the optimized pseudo-assembly-language code extract, discussed above. The load instruction on line 11 accesses the portion of memory containing the data member "numVotes" for an instance of the class "candidates," while the relocated load instruction on line 13 accesses memory that stores the data member "candidateNo." As seen in FIG. 5, these two memory accesses are to different virtual-memory pages. The DTLB is of fixed, relatively small size that is processor-implementation dependent. When a translation for a virtual-memory data address does not reside in the DTLB, a TLB-miss exception is raised, and a processor mechanism is invoked for searching for the translation in a virtual hash page table ("VHPT"). A TLB-miss exception thus incurs significant processor overhead, both in terms of processing cycles, as well as potential interruption of parallel processing. If a translation cannot be found in the VHPT, then an extremely expensive, operating-system page-fault handler is invoked to load the corresponding page into physical memory from a slower mass-storage device.

Consider two different scenarios. In a first scenario, referred to below as "Scenario 1," the ultimate winner of an election is the first instance of the class "candidate" stored in the data-array member "candidates," "candidates[0]." In this case, during the first iteration of the exemplary for-loop, the conditional statement on line 3 evaluates to TRUE, and lines 5 and 6 will be executed. In terms of the optimized assembly code, the predicate register "p3" contains the value "0," and the conditional branch instruction on line 15 does not transfer execution to line 18. Instead, intervening lines 16 and 17 are executed during the first iteration of the loop. However, thereafter, the conditional statement of the exemplary for-loop on line 3 always evaluates to FALSE, corresponding to the compare instruction on line 14 of the optimized assembly code always placing the value "1" in the predicate register "p3." Thus, in Scenario 1, the relocated load instruction of line 13 is executed in each iteration of the loop, while, in the non-optimized code, the load instruction would have been executed only a single time, during the first iteration of the loop. Because the load instruction on line 13 accesses a different virtual memory page from that accessed by the load on line 11, and because the loop is traversing a potentially lengthy array of instances of the class "candidate" that may not have been recently accessed, it is likely that each execution of the load instruction on line 13 incurs a TLB-miss exception. Thus, a large number of TLB-miss exceptions arise that would not have arisen in the non-optimized code. The small advantage obtained, during the first iteration of the loop, by relocating the load instruction originally on line 15 in the non-optimized code to line 13 of the optimized code, is vastly outweighed by the disadvantage of 99 potential subsequent unnecessary TLB-miss exceptions. One way to avoid this disadvantage would be to set the appropriate DCR-register bit to defer TLB-miss exceptions. In this case, only the single TLB-miss exception arising during the first iteration of the loop needs to be recovered in the recovery block. For all subsequent iterations of the loop, the chk.s instruction on line 16 is not executed, and no subsequent TLB-miss processing occurs.

Consider, however, a second scenario, referred to below as "Scenario 2." In Scenario 2, 100 entities of the class "candidates" are present in the data-array member "candidates," each instance of the class "candidate" having a number of votes equal to the index of the instance within the data array "candidates." In Scenario 2, the final instance of the class "candidate" in the data-array member "candidates," "candidates[99]," is eventually determined to be the winner. In Scenario 2, the conditional statement on line 3 of the exemplary for-loop evaluates to TRUE for each instance of the class "candidate" considered during iterations of the exemplary for-loop, and the statements on lines 5 and 6 are executed during each iteration of the exemplary for-loop. In the optimized assembly code, under scenario 2, the predicate register "p3" always has the value "0" following execution of the compare instruction on line 14. Thus, the chk.s instruction on line 16 executes for each iteration of the loop. In Scenario 2, TLB-miss instructions are configured for deferral, in order to solve the problem identified in Scenario 1. Now, however, because of deferral of the TLB-miss exceptions, each execution of the chk.s instruction on line 16 results in a branch to the recovery code, and a reexecution of the load instruction, with interruption of parallel processing and additional processing overhead. Under Scenario 2, it would be better to have not deferred TLB-miss exceptions, so that the TLB-miss events can be handled immediately as they arise, and parallel execution of the load instruction following handling of the TLB-miss exception can be realized. Or, it would have been better simply not to have relocated the load instruction in the first place.

The problem illustrated by the assembly-code extract under the two above-described scenarios is that dynamic, run-time-only-available information is needed to determine whether or not to defer TLB-miss exceptions. In Scenario 1, deferral is preferred, while, in Scenario 2, deferral is not preferred, and the difference between Scenarios 1 and 2 relates to the data stored in memory at run-time. In general, compiler cannot predict the contents of memory. For example, the contents of memory may be obtained from user-input, loaded from any of a variety of mass-storage devices, and otherwise determined during program execution. Unfortunately, modem processor architectures do not support a means for dynamically collecting control-speculation behavior data during run-time execution of routines. Current processor architectures do not provide a mechanism by which a processor can determine, at run-time, whether or not to defer a particular type of exception arising during execution of a speculated load instruction based on recent history of speculated-load-instruction execution.

Figure 6A:
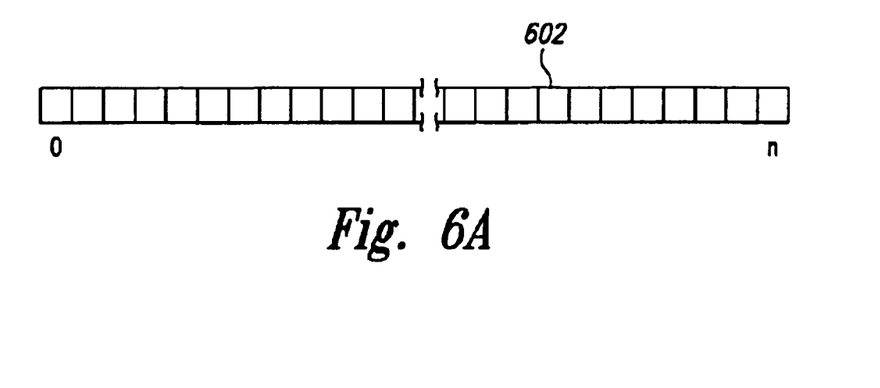
FIGS. 6A–B illustrate alternative embodiments of a speculative-load-accelerated-deferral table ("SpLADT").
Figure 6B:
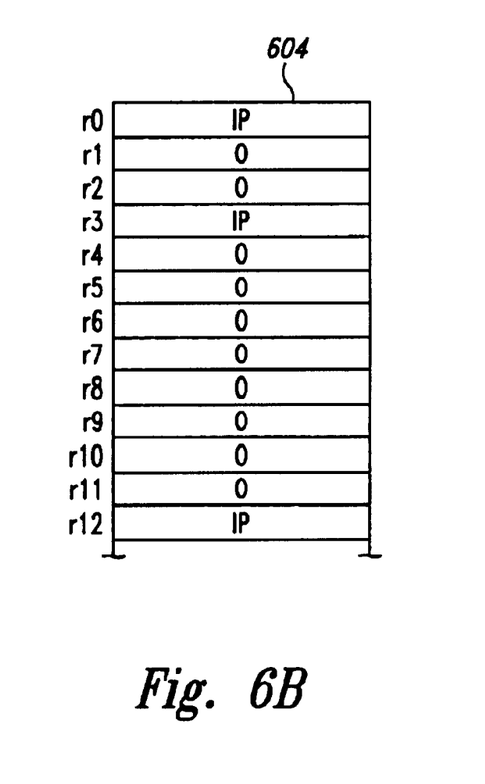

One embodiment of the current invention uses a special hardware-implemented table to maintain dynamic information about recovery of deferred exceptions for control-speculative load instructions. It should be noted that the present invention can be applied, in alternative embodiments, to eager deferral of any long latency operation, and not only to exceptions. FIGS. 6A–B illustrate alternative embodiments of a speculative-load-accelerated-deferral table ("SpLADT"). In a first embodiment, shown in FIG. 6A, the SpLADT 602 is an array of bits, or a register, incorporated within a modern processor, such as the IA-64 processor. The current value of the instruction pointer register ("IP"), or some number of bits of the instruction pointer, is used in a hardware hash function produce an index into the array of bits, or register, that implements the SpLADT. When the SpLADT entry has the value "1," then the results of a recent speculative load, probably at the instruction address corresponding to the current contents of the IP, were not consumed, while a value of "0" indicates that the results of a recent speculative load were consumed. In this first SpLADT embodiment, aliasing can occur. In other words, two different speculative load instructions may hash to the same SpLADT entry. When this occurs, a non-optimal choice as to whether or not to defer execution of an exception handling operation or other long-latency operation may be made. The probability of aliasing is generally small, and the load instruction is correctly executed, even in the non-optimal case.

In a second embodiment, shown in FIG. 6B, the SpLADT 604 is a small hardware table incorporated within a modern processor, such as the IA-64. Many different alternative SpLADT formats are possible. In one form of the SpLADT, the SpLADT is indexed, by general-purpose-register number, and the SpLADT entries store the contents of the IP at the time of execution of a control-speculative load instruction that targeted the indexing register. In other forms of the SpLADT, SpLADT entries may contain single-bit flags indexed by register, data memory addresses of data accessed by the corresponding load instruction, or memory-addresses and IP contents. In all cases, the SpLADT is intended to store entries corresponding to recently executed control-speculative load instructions. In one form of the SpLADT, discussed below, a SpLADT entry indicates the corresponding control-speculative instruction generated one or more exceptions during a recent execution that were not then recovered via chk.s mediated branches to recovery blocks, and that the target register of the control-speculative load instruction was not subsequently used by a non-speculative instruction. In the SpLADT format illustrated in FIG. 6, for example, the presence of a non-0 value in the first entry 604 corresponding to general-purpose-register "r1" indicates that the control-speculative load instruction with virtual-memory address indicated by the contents of entry 604, directed to register "r1," raised an exception that was not later recovered. In this case, the value "0" is a distinguished value indicating that no entry for the corresponding register is present. It is also possible for entries to be aliased, and therefore not be correctly interpreted. If aliasing is infrequent, there may be little penalty for ignoring aliasing. In general, eager deferral may optimize a load instruction at a given point in time, but failure to eagerly defer, or a deferral in a situation where immediate handling would provide better efficiency, does not lead to incorrect execution of the code, but only to less efficient execution of the code.

Figure 7:
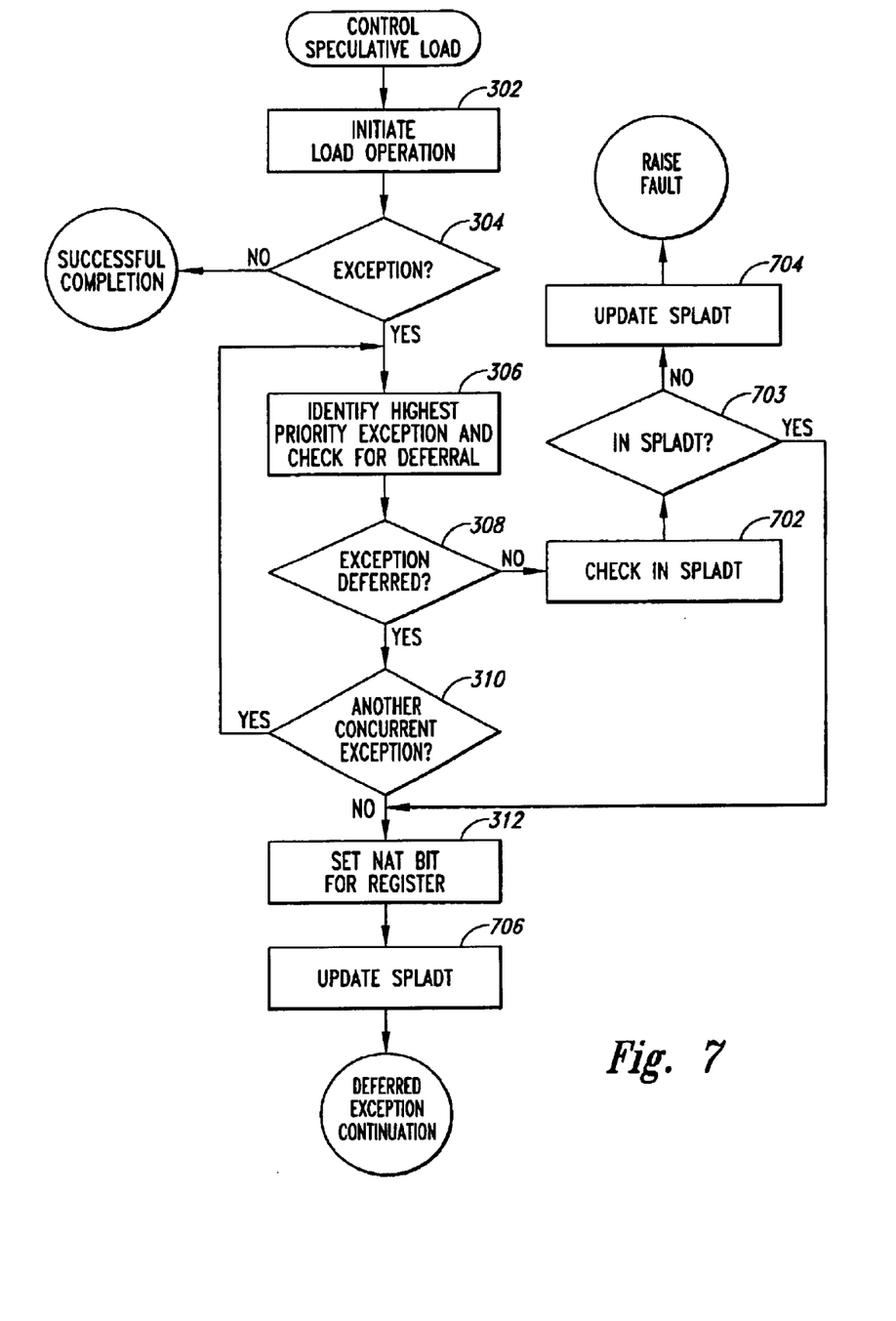
FIG. 7 is a flow-control diagram of a modified control-speculative load mechanism adapted for use with a speculative-load-accelerated-deferral table.

FIG. 7 is a flow-control diagram of a modified control-speculative load mechanism adapted for use with a speculative-load-accelerated-deferral table. Many of the steps shown in FIG. 7 are identical to those shown in FIG. 3, above, and are not again described in the interest brevity. Identical steps are identified using the same numerical labels as used in FIG. 3. Instead, in the following, the differences are pointed out. Following step 308, in which the processor determines that an exception that has been raised during execution of a control-speculative load cannot be deferred, the processor checks in the SpLADT, in step 702, to see whether the SpLADT contains an entry corresponding to the currently executed control-speculative load instruction.

Such an entry is identified, in one form of the SpLADT shown in FIG. 6A, by hashing the contents of all or a portion of the IP, and in a second form of the SpLADT, shown in FIG. 6B, by using the register to which the current control-speculative load instruction is directed as an index into the SpLADT to locate a SpLADT entry, and then comparing the current contents of the IP to the contents of the SpLADT entry. If the processor finds an entry in the SpLADT corresponding to the currently executed control-speculative load instruction, as determined in step 703, then the exception is deferred by control flowing to step 312. Otherwise, if a corresponding SpLADT entry is not found, then an exception is raised. Following steps 312 and 703, new steps 704 and 706 are carried out, in which the SpLADT is updated. An update may include inserting a new entry, removing an entry, or modifying an entry, depending on the type of SpLADT and on the precision with which the execution history is being stored.

It should be noted that, although the above-described implementation relates to exception handling, alternative embodiments of the present invention may be directed to eagerly deferring other long-latency operations that may be necessary for completing a speculative load operation. For example, a cache miss to main memory, page table accesses, and other types of operations may become needed, and may or may not be deferred, depending on the contents of the SpLADT. The need for such long-latency operations may be detected in step 302 of FIG. 7, and the SpLADT accessed, after step 302, to determine whether or not to defer the operation. It should also be noted that, following step 304, an entry may be placed into the SpLADT prior to successful completion, in certain implementations, while, in other implementations, an entry may be placed in the SpLADT during step 704. In other words, it may be desirable to set the SpLADT entry for both successful completions and deferred exception completions, or for only deferred exception completions.

Figure 8:
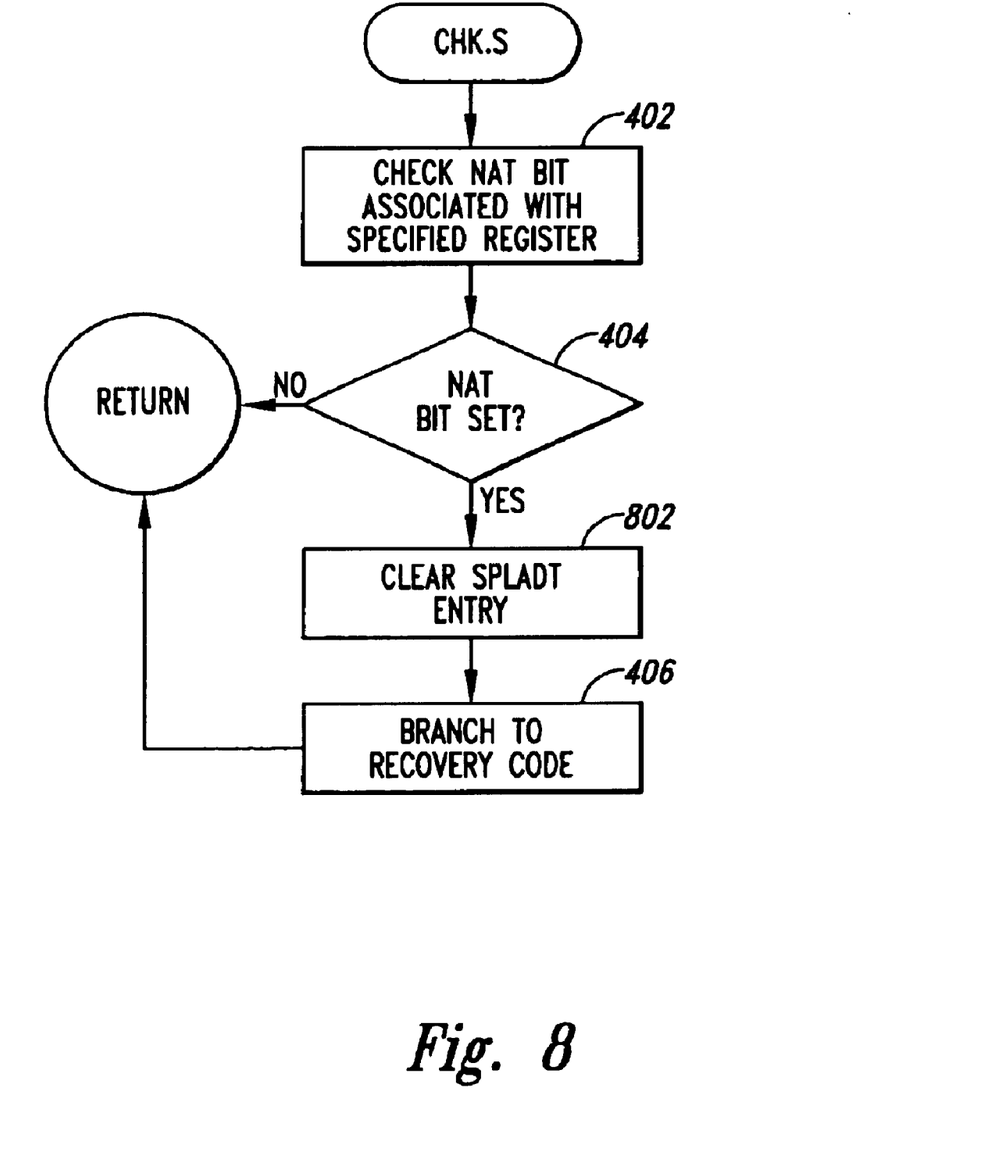
FIG. 8 is a flow-control diagram for execution of the chk.s instruction following a control-speculative load instruction, adapted to employ a speculative-load-accelerated-deferral table.

FIG. 8 is a flow-control diagram for execution of the chk.s instruction following a control-speculative integer load instruction, adapted to employ the speculative-load-accelerated-deferral table. As with FIG. 7, most of the steps in FIG. 8 are identical to steps illustrated in, and already discussed with respect to, FIG. 4, and are not again discussed in the interest of brevity. A new step 802 in the modified version of chk.s is inserted following step 404, in which the processor determines that the NAT bit associated with the specified register has been set. In this case, prior to branching to recovery code, the chk.s instruction clears the entry in the SpLADT corresponding to the specified control-speculative load instruction. It may be desirable to similarly modify the execution mechanism for other non-speculative instructions, so that they too clear a corresponding SpLADT entry for a register that they access with an associated NAT bit set to indicate a deferred exception. Also, as with NAT bits, it may be desirable to clear or modify SpLADT entries when the corresponding register is overwritten with a valid value, as, for example, by executing a register-to-register instruction that stores a value into the register. Finally, SpLADT entries may additionally be purged on context switches, because they may otherwise be inferred as related to unrelated control speculative load instructions, although, in reality, the probability is relatively low.

Thus, the IA-64 processor is modified, according to one embodiment of the present invention, to defer otherwise undeferrable exceptions arising during execution of control-speculative load instructions based on a recent history of execution of the control-speculative load instruction stored in the SpLADT. Consider again scenario 1, assuming that TLB-miss exceptions are configured to be immediately handled, and that SpLADT-based run-time deferral is enabled. In the first and second iterations of the loop, a TLB-miss exception arises and is immediately processed, because no corresponding entry in the SpLADT is found. However, thereafter, in subsequent loop iterations, the corresponding SpLADT entry is found, and the subsequent TLB-miss exceptions are therefore deferred. Under scenario 2, no SpLADT entry corresponding to the control-speculative load instruction on line 15 is found during any iteration of the loop, since each execution of the load instruction causes a TLB-miss exception which is then immediately handled.

Although the present invention has been described in terms of a particular embodiment, it is not intended that the invention be limited to this embodiment. Modifications within the spirit of the invention will be apparent to those skilled in the art. For example, it is also possible to carry out eager deferral in an opposite sense. An exception configured for deferral, upon finding no corresponding SpLADT entry, could be immediately raised despite the configuration. The sense of the presence of a SpLADT entry could be reversed as well, with a SpLADT entry indicating that an exception was not recently handled for a corresponding control-speculative load instruction, and the absence of a SpLADT entry indicating that an exception was recently handled for a corresponding control-speculative load instruction. In such cases, entries in the SpLADT may need to be entered, or cleared, upon first execution of a particular control-speculative load instruction. As discussed above, the SpLADT may include additional information, or different types of information, that would allow an entry to be more precisely correlated with a particular speculative instruction. For example,-the memory address of accessed data may be included in SpLADT entries. Additionally, more information that included counts of the number of times exceptions were handled and the number of times exceptions were not subsequently handled, and a sequence of the most recent results of executing a control-speculative load instruction, so that the deferral decision might be made based on additional history. As another example, correlations between long-latency operations could be detected and stored in the SpLADT, so that eager deferral prediction can be made based on such correlations. If, for example, the result of a first operation is always accessed when the result of a second operation is accessed, then, in the case that the result of the second operation is recently accessed, exceptions arising during execution of the first operation may not be eagerly deferred. SpLADTs may have many different types of formats, and many different modifications of the control-speculative load execution and chk.s execution mechanisms may be used to implement one of numerous different embodiments of the present invention. Additional information may be included in the SpLADT, for example, by entering separate entries for different classes of exception types, in order to make exception-type deferral decisions, eagerly deferring certain types of exceptions, while not deferring other types of exceptions for a particular control-speculative load instruction. Eager deferral of long latency operations associated with instructions other than load instructions may also be undertaken using the techniques of the present invention.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Obviously, many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

What is claimed is:

1. A method for using information obtained at run time about handling of deferred operations arising during execution of control-speculative load instructions to determine, at run time, whether or not to defer a long latency operation, the method comprising:

providing a speculative-load-accelerated-deferral table; and when the need for a long latency operation is detected during execution of a particular control-speculative load instruction, accessing the speculative-load-accelerated-deferral table to determine whether or not to defer the long latency operation exception based on a recent execution history for the control-speculative load instruction.

2. The method of claim 1 further including:

when there is an entry in the speculative-load-accelerated-deferral table corresponding to the particular control-speculative load instruction during execution of which the need for a long latency operation is detected, deferring the long latency operation;

when a control-speculative load instruction is executed, placing an entry for the control-speculative load instruction into the speculative-load-accelerated-deferral table; and when executing an instruction that consumes the contents of a register that was the target for a speculative load instruction for which a long latency operation was deferred, clearing any entry for a corresponding control-speculative load instruction from the speculative-load-accelerated-deferral table.

3. The method of claim 1 wherein the speculative-load-accelerated-deferral table contains an entry for each general register, and the entry can be accessed by using the register as an index into the speculative-load-accelerated-deferral table.

4. The method of claim 3 wherein a speculative-load-accelerated-deferral-table entry contains a distinguished value to indicate that no entry is present for a particular register, and contains the contents of the instruction pointer register at the time that an exception occurred during processing of a control-speculative load instruction.

5. The method of claim 1 wherein the speculative-load-accelerated-deferral table contains an entry for unique hash value produced from all, or a portion of, contents of an instruction pointer register, and the entry can be accessed by using the hash value as an index into the speculative-load-accelerated-deferral table.

6. The method of claim 5 wherein the speculative-load-accelerated-deferral table contains a single bit for each entry indicating whether or not results of a recently executed speculative load instruction were consumed.

7. The method of claim 1 wherein, when a long latency operation is deferred during execution of a speculative load instruction, setting a deferred operation attribute associated with the target register of the speculative load instruction.

8. The method of claim 1 wherein, when a non-speculative instruction is executed that uses a register with a deferred operation attribute, clearing any entry for a corresponding control-speculative load instruction from the speculative-load-accelerated-deferral table.

9. The method of claim 1 wherein long latency operations include exception handling, cache miss handling, page table accesses, and other operations that require processor cycles in addition to those needed to fetch a value from memory and load the value into a register.

10. The method of claim 1 wherein the speculative-load-accelerated-deferral table may contain additional information, including one or more of:

counts of the number of times the results of long-latency operations have been recently accessed;

counts of the number of times the results of long-latency operations have not been recently accessed;

information concerning correlations in result access of long-latency operations; and type and class information that can be used to predict whether results may be accessed following execution of long-latency operations on a per class or per type basis.

11. Hardware logic within a computer processor that implements the method of claim 1.

12. A computer processor that includes:

a speculative-load-accelerated-deferral table; and speculative-load-instruction execution logic that, when the need for a long latency operation is detected during execution of a particular control-speculative load instruction, accesses the speculative-load-accelerated-deferral table to determine whether or not to defer the long latency operation exception based on a recent execution history for the control-speculative load instruction.

13. The computer processor of claim 12 wherein the speculative-load-instruction execution logic:

defers a long latency operation during execution of a particular control-speculative load instruction when there is an entry in the speculative-load-accelerated-deferral table corresponding to the particular control-speculative load instruction, places an entry for a control-speculative load instruction into the speculative-load-accelerated-deferral table when the control-speculative load instruction is executed, and clears any entry for a corresponding control-speculative load instruction from the speculative-load-accelerated-deferral table when the result of the corresponding control-speculative load instruction is consumed by another non-speculative instruction.

14. The computer processor of claim 12 wherein the speculative-load-accelerated-deferral table contains an entry for each general register, and the entry can be accessed by using the register as an index into the speculative-load-accelerated-deferral table.

15. The computer processor of claim 13 wherein a speculative-load-accelerated-deferral-table entry contains a distinguished value to indicate that no entry is present for a particular register, and contains the contents of the instruction pointer register at the time that an exception occurred during processing of a control-speculative load instruction.

16. The computer processor of claim 12 wherein the speculative-load-accelerated-deferral table contains an entry for unique hash value produced from all, or a portion of, contents of an instruction pointer register, and the entry can be accessed by using the hash value as an index into the speculative-load-accelerated-deferral table.

17. The computer processor of claim 15 wherein the speculative-load-accelerated-deferral table contains a single bit for each entry indicating whether or not results of a recently executed speculative load instruction were consumed.

18. The computer processor of claim 12 wherein, when a long latency operation is deferred during execution of a speculative load instruction, the processor sets deferred operation attribute associated with the target register of the speculative load instruction.

19. The computer processor of claim 12 wherein, when a non-speculative instruction is executed that uses a register flagged with a deferred operation attribute, the processor clears any entry for a corresponding control-speculative load instruction from the speculative-load-accelerated-deferral table.

20. The computer processor of claim 12 wherein long latency operations include exception handling, cache miss handling, page table accesses, and other operations that require processor cycles in addition to those needed to fetch a value from memory and load the value into a register.

21. The computer processor of claim 12 wherein the speculative-load-accelerated-deferral table may contain additional information, including one or more of:

counts of the number of times the results of long-latency operations have been recently accessed;

counts of the results of long-latency operations have not been recently accessed;

information concerning correlations in result access of long-latency operations; and type and class information that can be used to predict whether results may be accessed following execution of long-latency operations on a per class or per type basis.

* * * * *